US010199695B2

(12) United States Patent
Lobert et al.

(10) Patent No.: US 10,199,695 B2
(45) Date of Patent: Feb. 5, 2019

(54) BATTERY MODULE WITH RESTRAINED BATTERY CELLS UTILIZING A HEAT EXCHANGER

(71) Applicant: Johnson Controls Technology Company, Holland, MI (US)

(72) Inventors: Jonathan P. Lobert, Hartford, WI (US); Matthew R. Tyler, Brown Deer, WI (US); Xugang Zhang, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 265 days.

(21) Appl. No.: 14/805,404

(22) Filed: Jul. 21, 2015

(65) Prior Publication Data

US 2016/0049703 A1  Feb. 18, 2016

Related U.S. Application Data

(60) Provisional application No. 62/038,664, filed on Aug. 18, 2014.

(51) Int. Cl.
*H01M 10/625* (2014.01)
*H01M 10/63* (2014.01)
(Continued)

(52) U.S. Cl.
CPC ....... *H01M 10/625* (2015.04); *H01M 2/1077* (2013.01); *H01M 4/485* (2013.01);
(Continued)

(58) Field of Classification Search
CPC ........... H01M 10/625; H01M 10/0525; H01M 10/63; H01M 10/6551; H01M 4/485;
(Continued)

(56) References Cited

U.S. PATENT DOCUMENTS 5,786,107 A  7/1998 Stafford et al.
6,821,671 B2  11/2004 Hinton et al.
(Continued)

FOREIGN PATENT DOCUMENTS

CN  201262974  6/2009
DE  102007063179  6/2009
(Continued)

OTHER PUBLICATIONS

PCT/US2015/045178 International Search Report and Written Opinion dated Oct. 29, 2015.

*Primary Examiner* — Stewart A Fraser
*Assistant Examiner* — Rachel L Zhang
(74) *Attorney, Agent, or Firm* — Fletcher Yoder P.C.

(57) ABSTRACT

A battery module includes a battery module housing, a heat exchanger including a plurality of fins disposed in the housing, a first lithium ion battery cell and a second lithium ion battery cell disposed within the battery module housing. The first lithium ion battery cell and the second lithium ion battery cell are separated by a fin of the plurality of fins. The module includes a temperature sensing component coupled to the fin separating the first and second battery cells. Filler material is disposed within the housing and between the battery cells and the fins to mechanically restrain the battery cells within the battery module housing. The filler materials conduct thermal energy between the battery cells and the fin. The filler material covers a free end of the fin and the temperature sensing component. The temperature sensing component is coupled to a conductor extending out of the filler material.

21 Claims, 7 Drawing Sheets

(51) Int. Cl.

| | | |
|---|---|---|
| *H01M 10/6551* | (2014.01) | |
| *H01M 4/485* | (2010.01) | |
| *H01M 10/0585* | (2010.01) | |
| *H01M 4/525* | (2010.01) | |
| *H01M 4/587* | (2010.01) | |
| *H01M 10/647* | (2014.01) | |
| *H01M 2/10* | (2006.01) | |
| *H01M 10/48* | (2006.01) | |
| *H01M 10/0525* | (2010.01) | |
| *H01M 4/505* | (2010.01) | |
| *H01M 10/653* | (2014.01) | |
| *H01M 10/6555* | (2014.01) | |
| *H01M 4/02* | (2006.01) | |
| *H01M 2/02* | (2006.01) | |

(52) U.S. Cl.
CPC .......... *H01M 4/505* (2013.01); *H01M 4/525* (2013.01); *H01M 4/587* (2013.01); *H01M 10/0525* (2013.01); *H01M 10/0585* (2013.01); *H01M 10/486* (2013.01); *H01M 10/63* (2015.04); *H01M 10/647* (2015.04); *H01M 10/653* (2015.04); *H01M 10/6551* (2015.04); *H01M 10/6555* (2015.04); *H01M 2/0217* (2013.01); *H01M 2004/027* (2013.01); *H01M 2004/028* (2013.01); *H01M 2220/20* (2013.01)

(58) Field of Classification Search
CPC ...... H01M 4/505; H01M 4/525; H01M 4/587; H01M 10/647; H01M 2/1077; H01M 10/486; H01M 10/0585
See application file for complete search history.

(56) References Cited

U.S. PATENT DOCUMENTS

| | | | |
|---|---|---|---|
| 7,241,530 B2 | 7/2007 | Oogami | |
| 8,323,819 B2 | 12/2012 | Lee et al. | |
| 8,343,648 B2 | 1/2013 | Unterdorfer et al. | |
| 8,367,239 B2 * | 2/2013 | Hermann | H01M 2/1077 429/100 |
| 8,481,191 B2 | 7/2013 | Hermann | |
| 8,597,812 B2 | 12/2013 | Terada et al. | |
| 8,652,678 B2 | 2/2014 | Musetti | |
| 9,123,944 B2 * | 9/2015 | Maguire | H01M 2/1077 |
| 2008/0090137 A1 * | 4/2008 | Buck | H01M 2/1077 429/120 |
| 2010/0108140 A1 | 5/2010 | Auman et al. | |
| 2011/0059347 A1 | 3/2011 | Lee et al. | |
| 2011/0223461 A1 | 9/2011 | Kim | |
| 2011/0244299 A1 | 10/2011 | Guener et al. | |
| 2011/0293982 A1 | 12/2011 | Martz et al. | |
| 2012/0009455 A1 | 1/2012 | Yoon | |
| 2012/0040226 A1 | 2/2012 | Kim et al. | |
| 2012/0088135 A1 * | 4/2012 | Kim | H01M 2/206 429/90 |
| 2012/0107649 A1 | 5/2012 | Anderson et al. | |
| 2012/0219839 A1 | 8/2012 | Kritzer et al. | |
| 2012/0315519 A1 | 12/2012 | Jin | |
| 2013/0122330 A1 * | 5/2013 | Hoerpel | H01M 2/021 429/7 |
| 2013/0164578 A1 | 6/2013 | Sweet et al. | |
| 2013/0202924 A1 | 8/2013 | Kwak et al. | |
| 2013/0202939 A1 | 8/2013 | Kwak et al. | |
| 2013/0209856 A1 | 8/2013 | Lev et al. | |
| 2013/0266837 A1 | 10/2013 | Lee et al. | |
| 2013/0302659 A1 | 11/2013 | Terada et al. | |
| 2013/0323564 A1 | 12/2013 | Beyerle, II et al. | |
| 2014/0030561 A1 | 1/2014 | Yoon et al. | |
| 2014/0093766 A1 | 4/2014 | Fees et al. | |

FOREIGN PATENT DOCUMENTS

| | | |
|---|---|---|
| DE | 102011081149 | 2/2013 |
| EP | 2178135 | 4/2010 |
| EP | 2418710 | 2/2012 |
| EP | 2608310 | 6/2013 |
| EP | 2340583 | 11/2013 |
| GB | 2483079 | 2/2012 |
| JP | 8321329 | 12/1996 |
| JP | 2009272048 | 11/2009 |
| JP | 2013051099 | 3/2013 |
| KR | 2008032748 | 4/2008 |
| KR | 2013091506 | 8/2013 |
| WO | 2012125115 | 9/2012 |
| WO | 2013009750 | 1/2013 |
| WO | 2014025869 | 2/2014 |

* cited by examiner

BATTERY MODULE WITH RESTRAINED BATTERY CELLS UTILIZING A HEAT EXCHANGER

CROSS REFERENCE TO RELATED APPLICATIONS

This application claims priority to and the benefit of U.S. Provisional Application Ser. No. 62/038,664, entitled "RETENTION OF A LITHIUM ION CELL IN A HEAT EXCHANGER BY MEANS OF AN ADHESIVE MATERIAL THAT PROVIDES BOTH MECHANICAL INTEGRITY AND THERMAL CONDUCTIVITY," filed Aug. 18, 2014, which is hereby incorporated by reference.

BACKGROUND

The present disclosure relates generally to the field of batteries and battery modules. More specifically, the present disclosure relates to methods of restraining battery cells within battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, lithium ion battery cells of a lithium ion battery module are usually tightly packed within the battery module packaging to maximize energy density of the battery module. A characteristic of certain lithium ion battery cells is a tendency to swell based on use and state of charge, which can cause issues with resistance growth in the cell. As such, the overall battery life is reduced. Accordingly, it is presently recognized that battery designs may be improved to provide improved mechanisms for reducing swell of the battery cells within the battery module that enable a greater lifespan of each battery cell.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a battery module including a battery module housing, a heat exchanger comprising a plurality of fins disposed in the battery module housing, and a first lithium ion battery cell and a second lithium ion battery cell disposed within the battery module housing. The first lithium ion battery cell and the second lithium ion battery cell are separated by a fin of the plurality of fins, and a temperature sensing component may be coupled to the fin separating the first and second lithium ion battery cells. A filler material formed from a curable epoxy resin may be disposed within the battery module housing and between the first and second lithium ion battery cells and the fin, such that the filler material is configured to cure to mechanically restrain the first and second lithium ion battery cells within the battery module housing and to conduct thermal energy between the first and second lithium ion battery cells and the fin. The filler material covers a free end of the fin and the temperature sensing component, and the temperature sensing component is coupled to a conductor extending out of the filler material.

The present disclosure also relates to a lithium ion battery module, including a module housing, a plurality of heat exchanger fins extending from a heat sink disposed within the module housing, a plurality of lithium ion battery cells disposed within the module housing and interleaved with the plurality of heat exchanger fins, a temperature sensor disposed on a free end of a heat exchanger fin of the plurality of heat exchanger fins, and an epoxy filler material disposed between plurality of the heat exchanger fins and the plurality of lithium ion battery cells and over the heat sink. The epoxy filler material may cover a portion of each lithium ion battery cell of the plurality of lithium ion battery cells, cover the temperature sensor, and cover the free end of the heat exchanger fin.

The present disclosure also relates to a process for forming a battery module housing. The battery module housing is prepared by a process including the steps of placing a heat exchanger including a plurality of heat exchanger fins into a battery module housing, positioning a first lithium ion battery cell and a second lithium ion battery cell on either side of a fin of the plurality of heat exchanger fins, positioning one or more temperature sensing components to a free end of one or more of the plurality of heat exchanger fins, filling the battery module housing with an epoxy filler material such that the fin of the plurality of heat exchanger fins and the one or more temperature sensing components are covered with the epoxy filler material, and curing the epoxy filler material such that the epoxy filler material restrains the lithium ion battery cells, the plurality of heat exchanger fins, and the temperature sensing components and serves as a thermal conduction path from the first and second lithium ion battery cells to a heat exchanger plate coupled to the plurality of heat exchanger fins.

DRAWINGS

Various aspects of this disclosure may be better understood upon reading the following detailed description and upon reference to the drawings in which.

Figure 6:
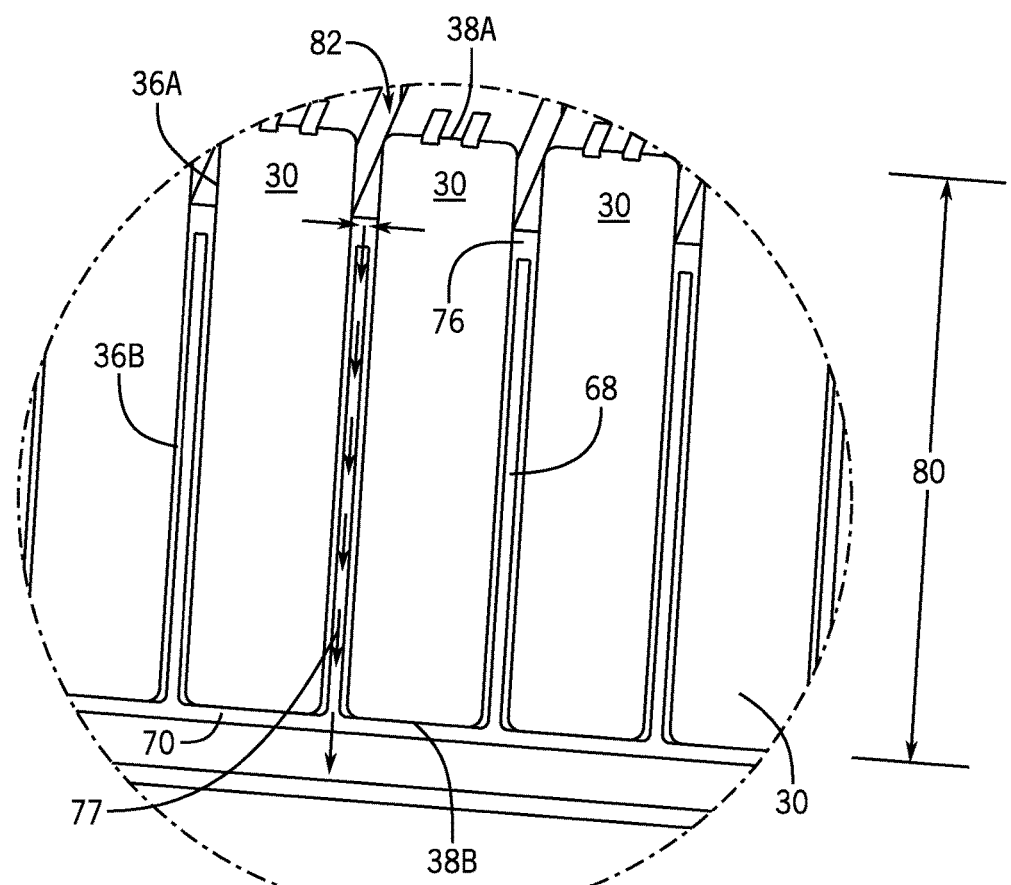
FIG. 6 is an expanded view of a portion of the battery module depicted in FIG. 5 along line 6-6, in accordance with an aspect of the present disclosure.
Figure 8:
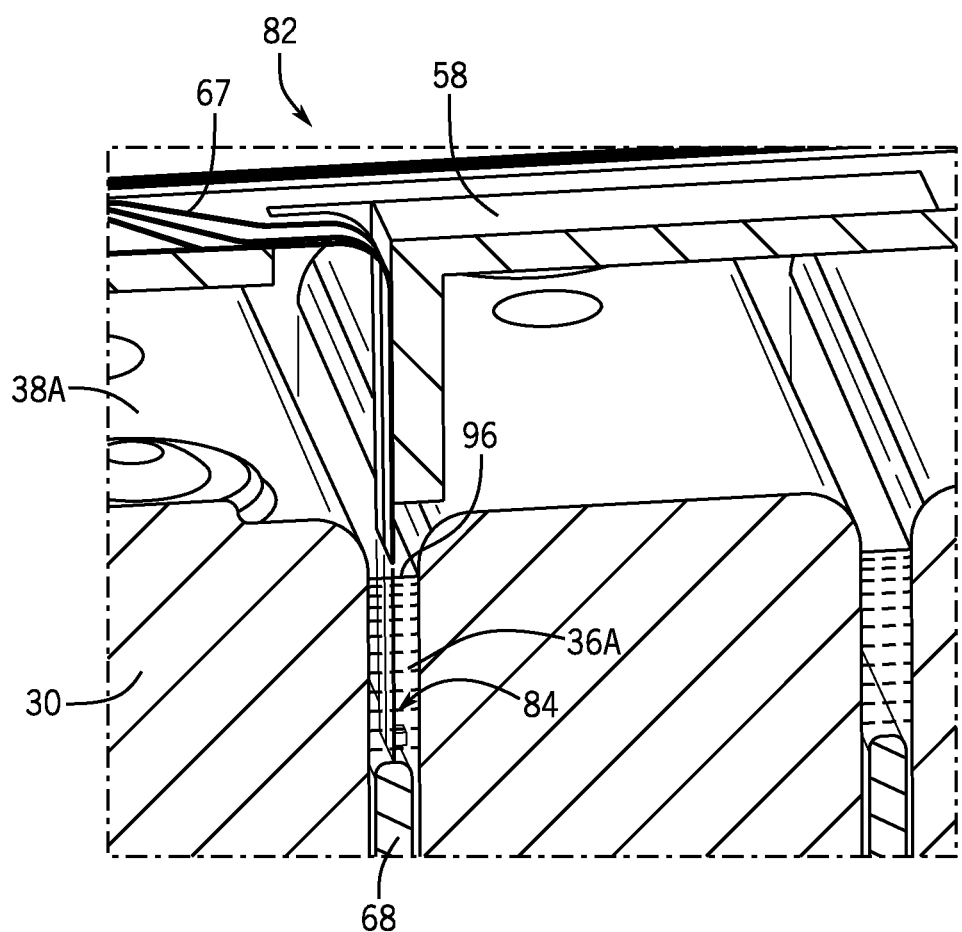
Figure 9:
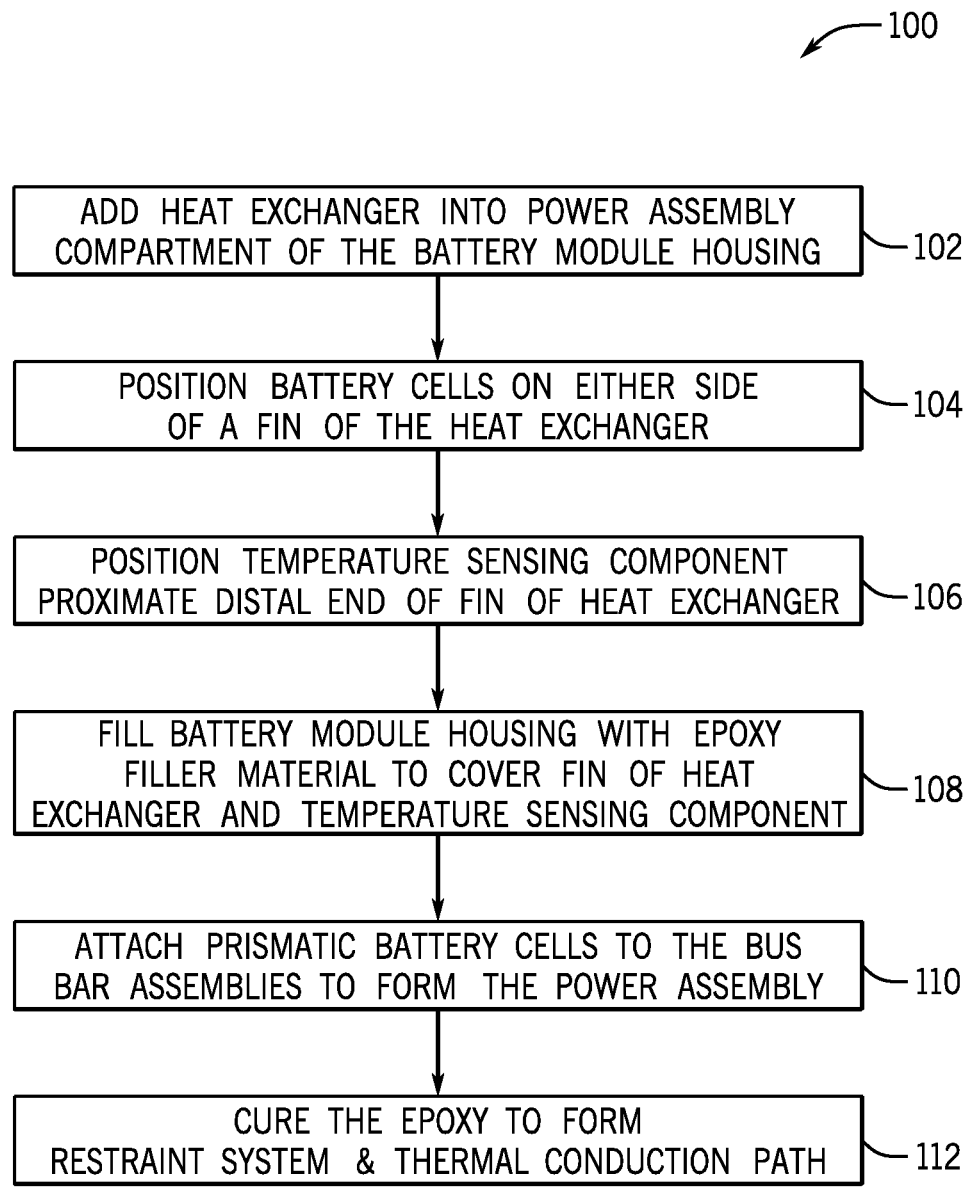

FIG. 8 is an expanded perspective view of a portion the battery module of FIG. 6 and depicting the positioning of temperature sensing features relative to heat exchange fins and battery cells of the module, in accordance with an aspect of the present disclosure; and FIG. 9 is a flow diagram illustrating an embodiment of a method for manufacturing a battery module, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of prismatic battery cells (e.g., lithium-ion (Li-ion) electrochemical cells) arranged to provide particular voltages and/or currents useful to power, for example, one or more components of an xEV.

The battery cells may have a variety of shapes and sizes, and the present disclosure is intended to generally apply to all of these variations as appropriate. However, as set forth above, certain types of battery cells having particular shapes, such as prismatic battery cells, may be subject to swelling and variations within a particular manufacturing tolerance. Unfortunately, such swelling can result in resistance growth in the cell and contribute to deformities in the battery modules. As such, the useful life span of the battery modules is reduced.

It is now recognized that these deformities can be problematic for certain techniques involved with battery module manufacturing, such as establishing a substantially uniform energy density for a set of battery modules, and also with establishing battery cell electrical interconnections using bus bars. For instance, as the battery cells swell, so may the distance between their respective terminals. Accordingly, establishing certain manufacturing specifications, such as distances between battery cell terminals, can be a challenge.

In addition, because of the potential variations in size, actuatable clamping mechanisms such as a clamp attached to the battery module, a movable plate disposed within the battery module housing that may be actuated (e.g., using a crank, a clamp, an adjustable tie and bolt mechanism) to abut against the battery cells, or an adjustable tie and bolt mechanism used to actuate components (e.g., outer or inner walls) of the battery module housing, may be used to compress the battery cells by a particular amount. This may be done to maintain the energy density and performance of the battery cells within a predetermined range. Prismatic battery cells, for example, are traditionally held in place by such actuatable clamping mechanisms that are a part of or integrated with a battery module housing.

It is now recognized that the use of certain restraining materials to individually restrain battery cells within a module may reduce the reliance on such clamping features, and can also provide certain benefits from a thermal management point of view. In accordance with an aspect of the present disclosure, present embodiments include battery module designs where battery cells are individually restrained between fins of a heat exchanger using with a filler material formed from a curable epoxy resin at the time of manufacturing. The battery cells may be interleaved with a plurality of fins of the heat exchanger within the battery module packaging, which may provide enhanced surface area for heat conduction to enable heat to be pulled away from the battery cells.

Additionally, the disclosed filler material may prevent each of the battery cells from substantially swelling during operation (e.g., swelling beyond a predetermined amount), thereby improving performance of the battery cells over the lifetime of the battery module. In general, the disclosed restraining medium (e.g., filler material) may be electrically insulating to prevent current leakages between the battery cells and may be thermally conductive to promote battery cell cooling during operation. Additionally, in certain embodiments, the restraining medium may also provide advantages by acting as a sink for heat and/or gases released during a thermal runaway event.

Figure 1:
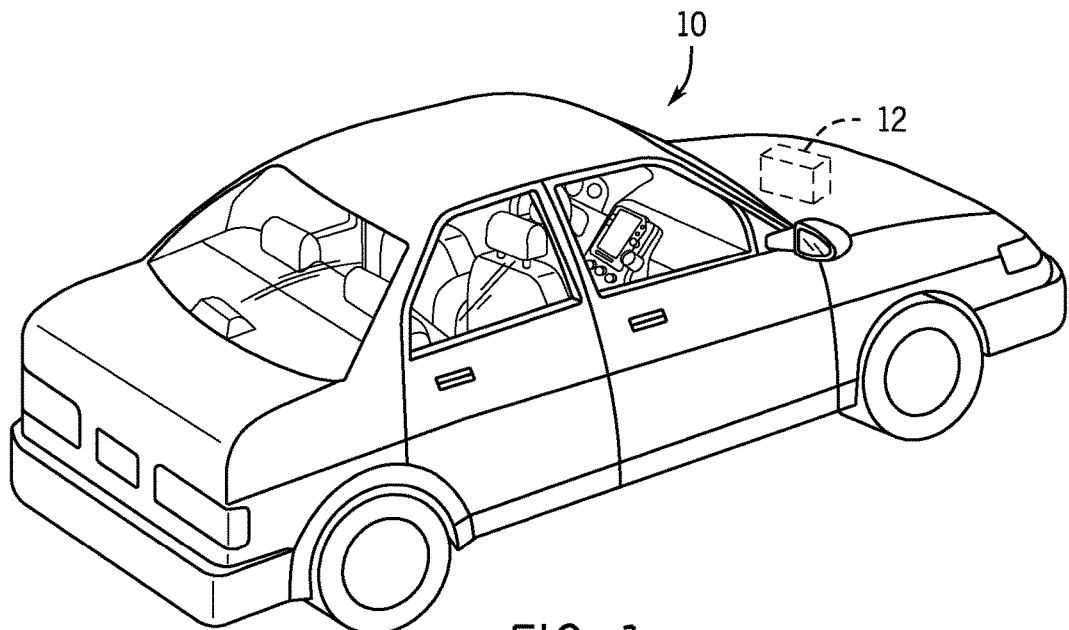
FIG. 1 is a perspective view of a vehicle having a battery module configured in accordance with present embodiments to provide power for various components of the vehicle, in accordance with an aspect of the present disclosure.

With the foregoing in mind, present embodiments relating to individually restrained battery cells and associated features may be applied in any number of energy expending systems (e.g., vehicular contexts and stationary power contexts). To facilitate discussion, embodiments of the battery modules described herein are presented in the context of battery modules (e.g., Li-ion battery modules) employed in xEVs. To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
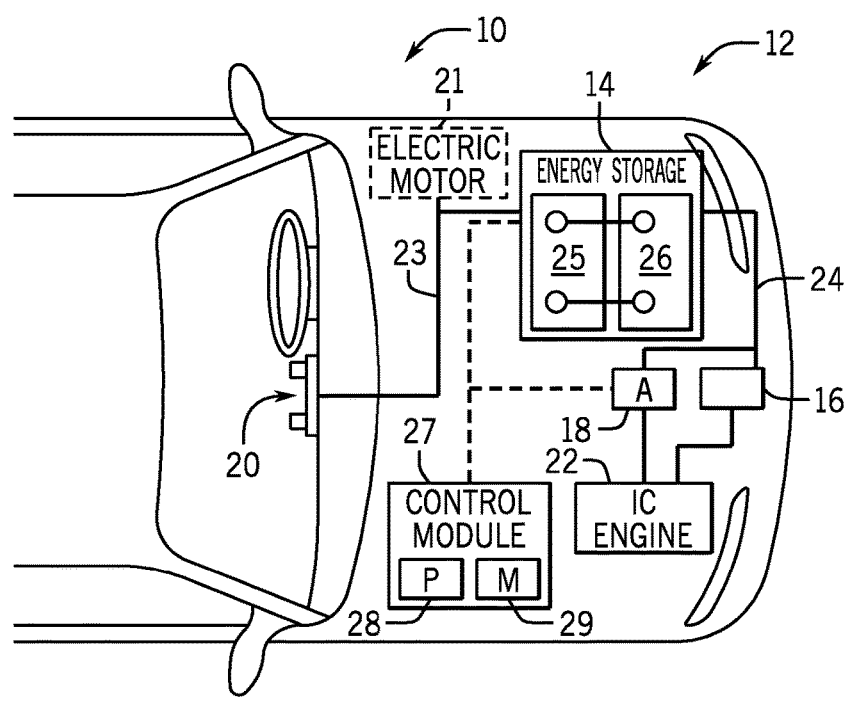
FIG. 2 is a cutaway schematic view of an embodiment of the vehicle and the battery module of FIG. 1, in accordance with an aspect of the present disclosure.

A more detailed view of the battery system 12 is described in FIG. 2. As depicted, the battery system 12 includes an energy storage component 14 coupled to an ignition system 16, an alternator 18, a vehicle console 20, and optionally to an electric motor 21. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20 and the ignition system 16, which may be used to start (e.g., crank) the internal combustion engine 22.

Additionally, the energy storage component 14 may capture electrical energy generated by the alternator 18 and/or the electric motor 21. In some embodiments, the alternator 18 may generate electrical energy while the internal combustion engine 22 is running More specifically, the alternator 18 may convert the mechanical energy produced by the rotation of the internal combustion engine 22 into electrical energy. Additionally or alternatively, when the vehicle 10 includes an electric motor 21, the electric motor 21 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 21 during regenerative braking As such, the alternator and/or the electric motor 21 are generally referred to herein as a regenerative braking system.

To facilitate capturing and supplying electric energy, the energy storage component 14 may be electrically coupled to the vehicle's electric system via a bus 24. For example, the bus 24 may enable the energy storage component 14 to receive electrical energy generated by the alternator 18 and/or the electric motor 21. Additionally, the bus may enable the energy storage component 14 to output electrical energy to the ignition system 16 and/or the vehicle console 20. Accordingly, when a 12 volt battery system 12 is used, the bus 24 may carry electrical power typically between 8-18 volts.

Additionally, as depicted, the energy storage component 14 may include multiple battery modules. For example, in the depicted embodiment, the energy storage component 14 includes a lithium ion (e.g., a first) battery module 25 and a lead-acid (e.g., a second) battery module 26, which each include one or more battery cells. In other embodiments, the energy storage component 14 may include any number of battery modules. Additionally, although the lithium ion battery module 25 and lead-acid battery module 26 are depicted adjacent to one another, they may be positioned in different areas around the vehicle. For example, the lead-acid battery module 26 may be positioned in or about the interior of the vehicle 10 while the lithium ion battery module 25 may be positioned under the hood of the vehicle 10.

In some embodiments, the energy storage component 14 may include multiple battery modules to utilize multiple different battery chemistries. For example, when the lithium ion battery module 25 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 27. More specifically, the control module 27 may control operations of components in the battery system 12, such as relays (e.g., switches) within energy storage component 14, the alternator 18, and/or the electric motor 21. For example, the control module 27 may regulate amount of electrical energy captured/supplied by each battery module 25 or 26 (e.g., to de-rate and re-rate the battery system 12), perform load balancing between the battery modules 25 and 26, determine a state of charge of each battery module 25 or 26, determine temperature of each battery module 25 or 26, control voltage output by the alternator 18 and/or the electric motor 21, and the like.

Accordingly, the control module 27 may include one or processor 28 and one or more memory 29. More specifically, the one or more processor 28 may include one or more application specific integrated circuits (ASICs), one or more field programmable gate arrays (FPGAs), one or more general purpose processors, or any combination thereof. Additionally, the one or more memory 29 may include volatile memory, such as random access memory (RAM), and/or non-volatile memory, such as read-only memory (ROM), optical drives, hard disc drives, or solid-state drives. In some embodiments, the control module 27 may include portions of a vehicle control unit (VCU) and/or a separate battery control module. Furthermore, as depicted, the lithium ion battery module 25 and the lead-acid battery module 26 are connected in parallel across their terminals. In other words, the lithium ion battery module 25 and the lead-acid module 26 may be coupled in parallel to the vehicle's electrical system via the bus 24.

Figure 3:
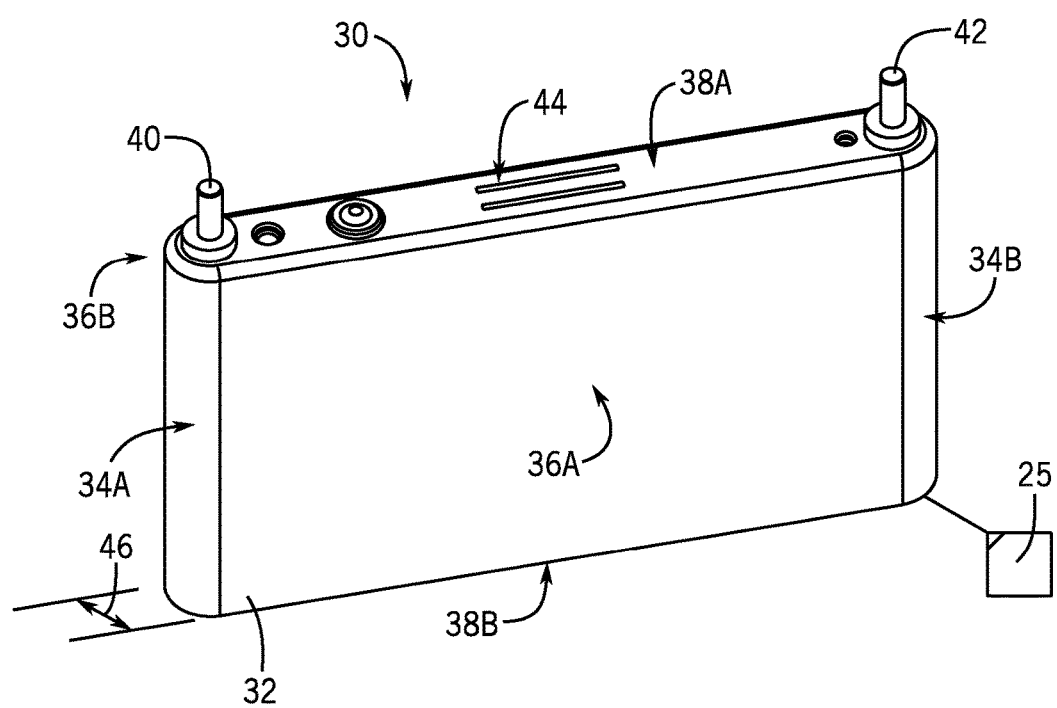
FIG. 3 is an overhead perspective view of an embodiment of a prismatic battery cell used in a battery module, in accordance with an aspect of the present disclosure.

The lithium ion battery modules 25 described herein, as noted, may include a number of lithium ion electrochemical cells (e.g., lithium ion battery cells) electrically coupled to provide particular currents and/or voltages to provide power to the xEV 10. FIG. 3 is a perspective view of an embodiment of a battery cell 30, in particular a prismatic battery cell, that may be used within the presently disclosed battery module 25. Again, other battery cell shapes and designs may be incorporated into other similarly-configured battery modules. The illustrated battery cell 30 has a packaging 32 (e.g., a metallic or plastic "casing" or "can") that encloses the internal components of the cell, including cathode and anode materials and a suitable electrolyte. The battery cell 30 may be any suitable type of lithium ion electrochemical cell, including but not limited to lithium nickel manganese cobalt oxide (NMC) and lithium titanate (LTO) battery cells, NMC/graphite battery cells, and so forth. By way of example, the positive electrode (cathode) active material and/or the negative electrode (anode) active material may be a lithium metal oxide (LMO) component or a blend of multiple LMO components. As used herein, lithium metal oxides (LMOs) may refer to any class of materials whose formula includes lithium and oxygen as well as one or more additional metal species (e.g., nickel, cobalt, manganese, aluminum, iron, or another suitable metal). A non-limiting list of example LMOs may include: mixed metal compositions including lithium, nickel, manganese, and cobalt ions such as lithium nickel cobalt manganese oxide (NMC) (e.g., $LiNi_xCo_yMn_zO_2$), lithium nickel cobalt aluminum oxide (NCA) (e.g., $LiNi_xCo_yAl_zO_2$), lithium cobalt oxide (LCO) (e.g., $LiCoO_2$), and lithium metal oxide spinel (LMO-spinel) (e.g., $LiMn_2O_4$).

By specific example, in certain embodiments, the positive electrode (cathode) active material may be include NMC blend and the negative electrode (anode) active material may include LTO for the illustrated battery cell 30. In other embodiments, the positive electrode (cathode) active material may include any one or a combination of the lithium metal oxides noted above and the negative electrode (anode) active material may include graphite for the illustrated battery cell 30. However, it may be appreciated that the present disclosure is not intended to be limited to a particular combination of cathode and anode active materials and, indeed, is intended to be compatible with any appropriate combination of active materials including cathode and anode active materials that may be subject to swelling. Additionally, the packaging or case 32 of the illustrated prismatic battery cell 30 may have no substantial polarity (is a neutral can), or may have a positive or negative polarity.

The battery cell 30 illustrated in FIG. 3 is prismatic, where a prismatic battery cell, as defined herein, includes a prismatic case that is generally rectangular in shape. In contrast to pouch cells, the prismatic casing is formed from a relatively inflexible, hard (e.g., metallic or plastic) material. However, it should be noted that certain of the embodiments described below may incorporate pouch cells and/or cylindrical cells in addition to or in lieu of prismatic battery cells.

The packaging 32 of the illustrated prismatic battery cell 30 includes rounded end portions 34A and 34B as well as substantially flat front and back faces 36A and 36B. In accordance with present embodiments, each prismatic battery cell 30 may include a top portion 38A, where a set of cell terminals 40, 42 (e.g., positive and negative cell terminals) are located. One or more cell vents 44 may also be located on the top portion 38A, or any other suitable location. The packaging 32 of the illustrated prismatic battery cell 30 also includes a bottom portion 38B positioned opposite the top portion 38A. First and second end portions 34A and 34B, which may be straight or rounded, extend between the bottom and top casing portions 38A, 38B in respective positions corresponding to the cell terminals 40, 42. Front and back faces 36A, 36B, which may be flat (as shown) or may include other geometric features, couple the first and second end portions 34A, 34B at opposing ends of the packaging 32 of the illustrated prismatic battery cell 30.

It may be appreciated that, in certain embodiments, the illustrated prismatic battery cell 30 may swell or expand during operation. For example, in embodiments where the prismatic battery cell 30 is a lithium ion battery cell having a graphitic anode active material (e.g., or layers of a "coil" disposed within the packaging 32 of the prismatic battery cell 30), the coil may expand as a result of Li intercalation during charging. Additionally, in certain embodiments, the prismatic battery cell 30 may also expand as a result of resistive heating when charging. As such, for certain embodiments, if the packaging 32 of the prismatic battery cell 30 is not properly restrained, then the packaging 32 may bulge and swell as a result of the expansion of the internal components of the cell. This reduces energy density and performance of the battery cell 30. Additionally, as the prismatic battery cell 30 swells, the individual cathode and anode layers of the "coil" may be allowed to separate from one another (e.g., de-laminate), increasing the resistance of the battery cell 30. As such, it is generally desirable to restrain the prismatic battery cell 30 in such a manner that the packaging 32 is not able to substantially swell or expand during charge/discharge cycles to maintain the performance and the longevity of the prismatic battery cell 30. Restraining the battery cells 30 is also beneficial for maintaining cell terminal to terminal connections.

Figure 4:
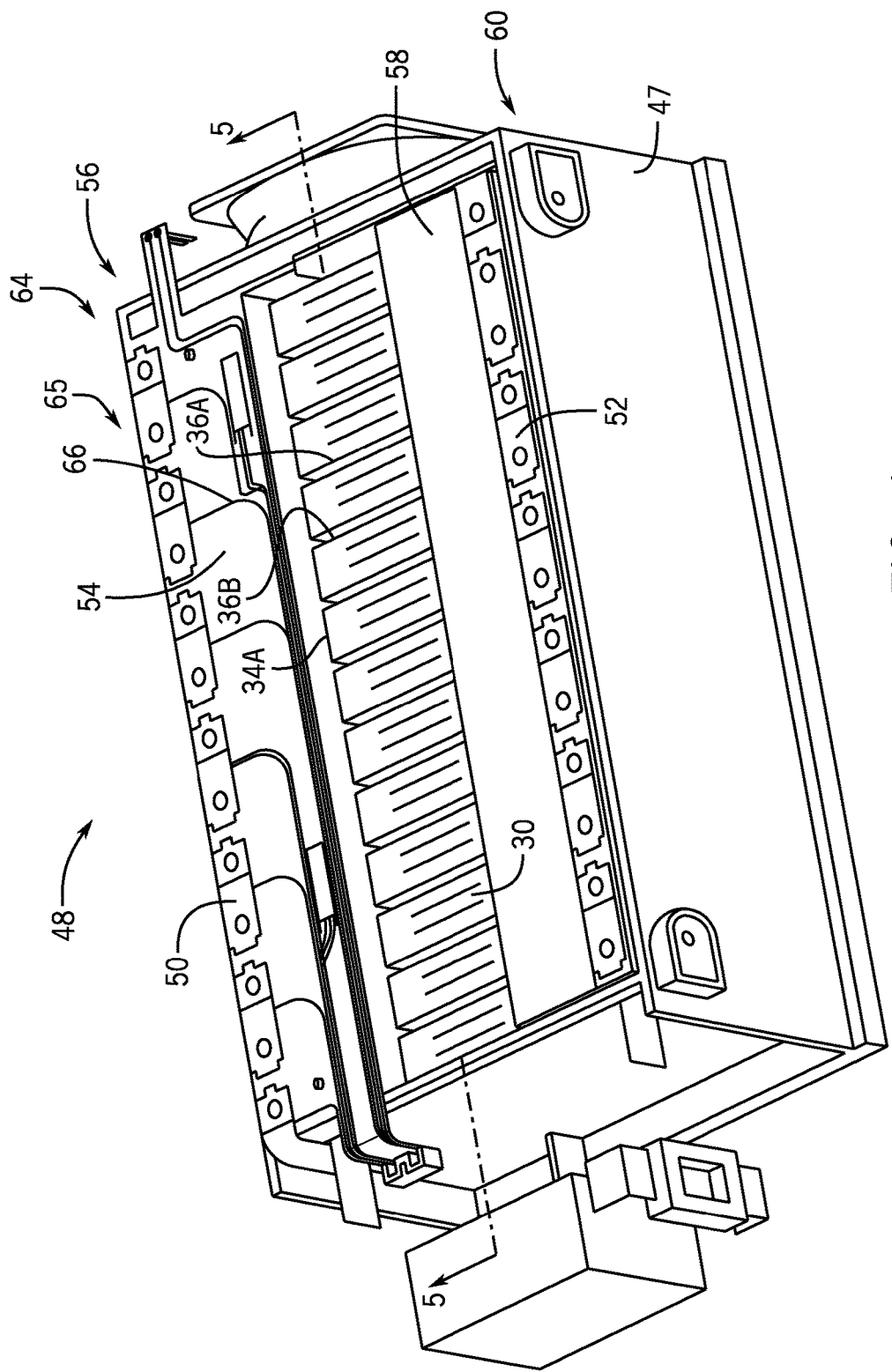
FIG. 4 is an overhead perspective view of an embodiment of a power assembly of a battery module, in accordance with an aspect of the present disclosure.

Presently disclosed embodiments of the battery module 25 may include a number of such prismatic battery cells 30 that are restrained against heat fins via a restraining mechanism, which may restrict the expansion of the battery cells during charge/discharge cycles. FIG. 4 is a perspective view illustrating a non-limiting example of the manner in which the prismatic battery cells 30 may be arranged within a housing 47 of the battery module 25. In FIG. 4, only a portion of the battery module 25 is shown. The illustrated battery module 25 includes a power assembly 48 including a plurality of prismatic battery cells 30 electrically coupled to one another via first bus bars 50 and second bus bars 52. More specifically, the first bus bars 50 are positioned on a first carrier 54 over the terminals 40, 42 (see FIG. 3) of the cells 30 disposed at a first side 56 of the module 25, and the second bus bars 52 are positioned on a second carrier 58 disposed at a second side 60 of the module 25. Each prismatic battery cell 30 may be oriented electrically opposite the adjacent prismatic battery cell 30, such that the negative terminals 42 of the prismatic battery cells 30 are disposed near the positive terminals 40 of the neighboring prismatic battery cell 30. In the illustrated embodiment, the first and second bus bars 50, 52 electrically couple the positive terminal of one prismatic battery cell (e.g., the positive terminal 40 of the prismatic battery cell 30) to the negative terminal of an adjacent prismatic battery cell (e.g., the negative terminal 42 of the prismatic battery cell 30). Once fully assembled, each of the terminals of the prismatic battery cells 30 of the power assembly 48 would be coupled to one of the first or second bus bars 50, 52, except for the battery cells 30 at either end of the power assembly, which may be electrically coupled other portions (e.g., a master relay, power conversion circuitry) of the battery module 25. The front and back faces 36A, 36B may be substantially parallel to the front and back end portions 34A, 34B of an adjacent prismatic battery cell 30.

In certain embodiments, the bus bar carriers 54, 58 may be polymeric and the bus bars 50, 52 may be monometallic or bimetallic. That is, for embodiments in which the prismatic battery cells 30 include an embodiment of the positive terminal 40 made from a first metal (e.g., aluminum) and an embodiment of the negative terminal 42 made from a second metal (e.g., copper), a portion of each bus bar 50, 52 may be made from the first metal (e.g., aluminum), and another portion may be made from the second metal (e.g., copper) to enable effective laser welding and mitigate galvanic effects. The bus bars 50, 52 may also include other materials, such as coatings, to facilitate welding (e.g., laser welding) to electrically couple the battery cells 30 to their terminals 40, 42.

In accordance with present embodiments, the first bus bars 50 and the first carrier 54 may be considered to be a part of a sensing and bus bar assembly 64, which may include features (e.g., bus bars 50) configured to electrically couple the battery cells 30 and other features configured to sense, for example, a temperature of the battery cells 30 (e.g., during operation of the battery module 25). In the illustrated embodiment, the sensing and bus bar assembly 64 includes sense lines 65 (e.g., voltage sense lines 66) connected to the first bus bars 50 to enable the control module 27 (see FIG. 2) to monitor a voltage across the battery cells 30. Such monitoring may enable the control module 27 to control the operation of the battery module 25 for voltage output, temperature control, or similar purposes. The illustrated sensing and bus bar assembly 64 also includes certain temperature sensing features, which are described in further detail below with respect to FIGS. 8 and 9.

Figure 5:
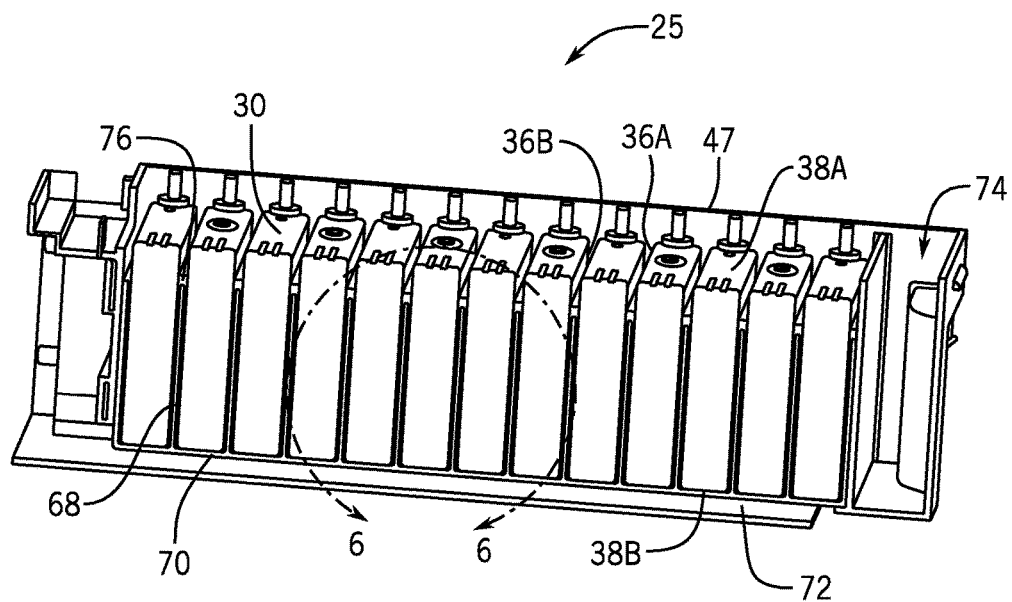
FIG. 5 is a cross-sectional perspective view of the battery module of FIG. 4, taken along line 5-5, in accordance with an aspect of the present disclosure.

The restraint of the battery cells 30 within the module housing 47 may be further appreciated with respect to FIG. 5. In particular, FIG. 5 is a cross-sectional perspective view of the battery module 25 of FIG. 4 taken along line 5-5. In the illustrated embodiment of the battery module 25, a plurality of prismatic battery cells 30 positioned within the housing 47 are fixed between a plurality of heat exchanger fins 68 of a heat sink 70. Note that specifically, the heat exchanger fins 68 and the battery cells 30 are interleaved (e.g., alternating). The heat sink 70 may be disposed on a bottom 72 of the housing 47. The heat exchanger fins 68 may be substantially parallel to the front and back faces 36A, 36B of the prismatic battery cells 30, which may enable improved heat exchange compared to other relative positions. In addition to the region where the battery cells 30 are restrained in the housing 47, the illustrated battery module 25 also includes other compartments, including one or more compartments 74 configured to house other components (e.g., relays, control circuitry) of the battery module 25 separately from the battery cells 30 and from a filler material 76 restraining the cells 30 in the housing 47.

The filler material 76, as shown in the expanded view of FIG. 6, covers the heat exchanger fins 68 and portions of the battery cells 30. In some embodiments, the filler material 76 may contact a portion of the front and back faces 36A, 36B. The filler material 76 may also contact portions of the heat sink 70 that are substantially perpendicular to the front and back faces 36A, 36B of the prismatic battery cells 30. The filler material 76 may conform to all of the surfaces it contacts, enabling enhanced heat transfer between the filler material 76 and certain thermally conductive components (e.g., the heat exchanger fins 68 and the battery cells 30).

The filler material 76 may also absorb some of the heat produced by the battery cells 30. In certain embodiments, the filler material 76 may have a substantially uniform thermal conductivity in all directions. By way of non-limiting example, the thermal conductivity value of the filler material 76 may be between approximately 0.5 Watts per meter Kelvin (W/m-K) and approximately 1.5 W/m-K. Additionally, the heat exchanger fins 68 provide more surface area for the heat produced by the prismatic battery cells 30 to be dispersed to. For example, the fins 68 may transfer heat (e.g., through conduction) from the prismatic battery cells 30 downwards to the heat sink 70, as described further in FIG. 6.

FIG. 6 is an expanded view of a portion of the battery module 25 depicted in FIG. 5 along line 6-6, in accordance with an aspect of the present disclosure. The filler material 76 provides a thermally conductive pathway between the prismatic battery cells 30 and the heat exchanger fins 68. As such, heat produced from the prismatic battery cells 30 may be dissipated as heat from the hot battery cells 30 flows (e.g., as shown by arrow 77) to a cooler surface of the heat exchanger fins 68.

As noted above, the front and back faces 36A, 36B (e.g., an interface surface) of the cells 30 extend between the top portion 38A and the bottom portion 38B of the cells 30. The filler material 76 may completely cover the heat exchanger fins 68 and a portion of the prismatic battery cells 30. The filler material 76 may cover the bottom portion 38B of the battery cells 30. Depending on the amount of filler material 76 utilized, the filler material 76 may cover approximately 60%, 65%, 70%, 75%, 80%, 85%, to 90% of a longitudinal distance 80 of the side portions 36A, 36B of the battery cells 30. Covering the side portions 36A, 36B of the battery cells 30 improves restraint of the battery cells 30 within the battery module housing 47 and provides a thermal conduction path from the first and second lithium ion battery cells 30 to the heat exchanger plate coupled to the plurality of heat exchanger fins 68. The top portion 38A of each of the battery cells 30 may protrude beyond a free end 82 (e.g., distal end from the heat exchanger plate) of the fin 68 along the longitudinal distance 80 of the battery cells 30. The filler material 76 may also cover a portion of the heat sink 70. The filler material 76 may also contact portions of the heat sink 70 that are substantially perpendicular to the front and back faces 36A, 36B of the prismatic battery cells 30. It should be appreciated that though the heat exchanger fins 68 depicted are substantially straight, the heat exchanger fins 68 may be tapered, or have different geometries. All or a portion of the heat exchanger fins 68, whether substantially straight, tapered, or with varying geometries, may be covered with the filler material 76, as described further with respect to FIG. 8. The heat exchanger fins 68 may be coupled to temperature sensing components 84 disposed in the bus bar assembly 64 (see FIG. 4) to provide temperature readings to a control module 27.

Figure 7:
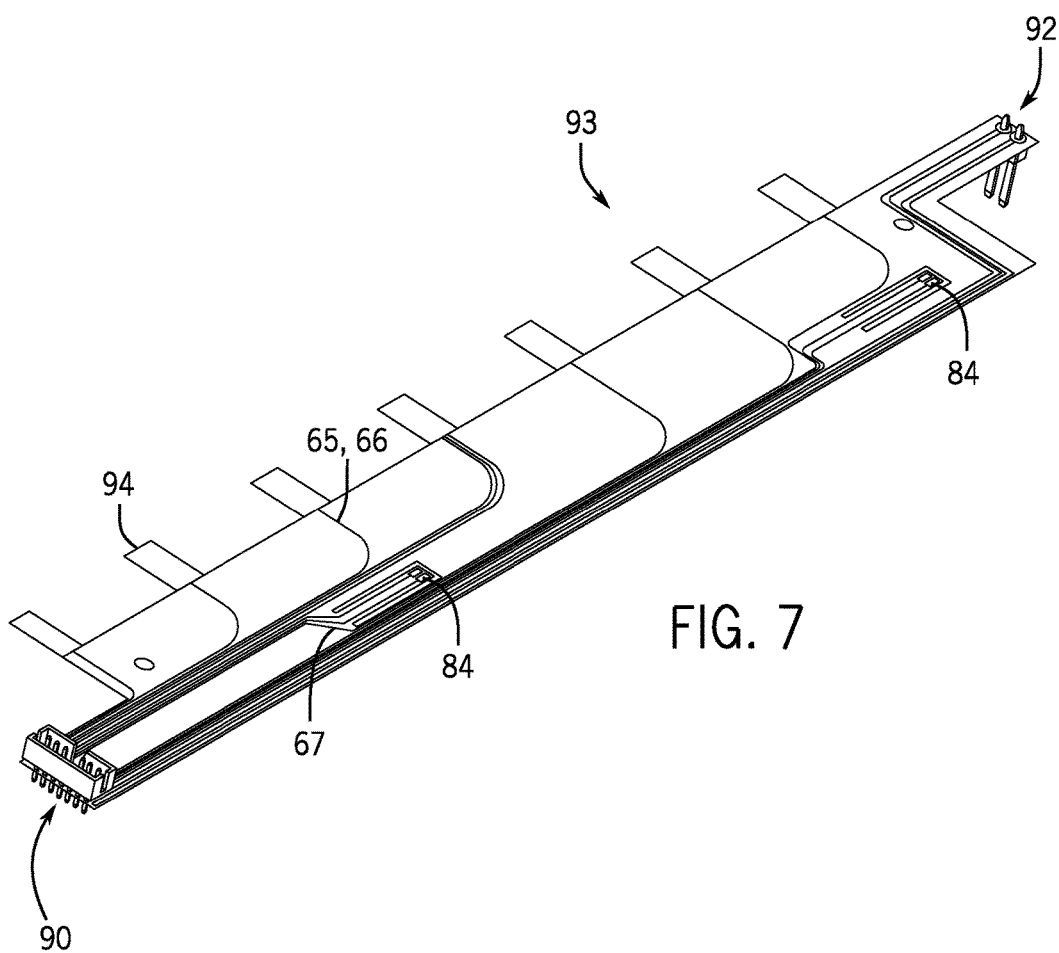
FIG. 7 is a perspective view of an embodiment of a temperature sensing component of the sensing and bus bar assembly of FIG. 4, in accordance with an aspect of the present disclosure.

An embodiment of temperature sensing components 84 of the bus bar assembly 64 are depicted in FIG. 7. Specifically, FIG. 7 is a perspective view of an embodiment of temperature sensing components 84 of the sensing and bus bar assembly 64 of FIG. 4, in accordance with an aspect of the present disclosure. A sensing circuit assembly 93 of the bus bar assembly 64, which may be a flexible circuit including the temperature sensing components 84 and the voltage sense lines 66, are also depicted. The plurality of temperature sensing components 84 may be surface mount devices configured to monitor the temperature of the fins 68 (see FIG. 6). The temperature sensing components 84 may be communicatively coupled to the control module 27 (see FIG. 2). The control module may be same control module 27 that controls operations of components in the battery system 12, such as relays (e.g., switches) within energy storage component 14, the alternator 18, and/or the electric motor 21. In some embodiments, the control module may be different than the control module 27 that controls other components (e.g., electric motor 21). In either case, the control module 27 may regulate amount of electrical energy captured/supplied by the battery module 25 based at least in part on the temperatures sensed by the temperature sensing components 84.

The temperature sensing components 84 may be coupled to the plurality of sense lines 65 (e.g., the voltage sense lines 66 or temperature sense lines 67) disposed on the carrier bar 58 (see FIG. 4). The voltage sense lines 66 may carry current and/or voltage signals to the control module 27. The plurality of temperature sensing lines 67 may provide the temperature reading of the temperature sensing components 84 to the control module 27. The sense lines 65 may be coupled to the carrier bar 58 and/or one or more bus bars 50, 52 via welding (e.g., ultrasonic welding) or in other suitable manners. A plurality of solder pads 94 are also provided that couple to the bus bars 50, 52. In some embodiments, the solder pads 94 are meant to bond to a copper side of the bus bar 50, 52. The solder pads 94 are coupled to the voltage sense lines 66 disposed on sensing circuit assembly 93. End connectors 88 (a first end connector 90, a second end connector 92) may be coupled to other components, such as to a board connector.

The positions of the components of the sensing circuit assembly 93 may be further understood as illustrated in FIG. 8. FIG. 8 is an expanded perspective view of a portion the battery module 25 of FIG. 6 and depicting the positioning of temperature sensing features 84 relative to heat exchange fins 68 and battery cells 30 of the module, in accordance with an aspect of the present disclosure. Disposed on the carrier bars 54, 58 are the plurality of temperature sense lines 67. Again, the temperature sensing lines 67 extend from the temperature sensing component 84 to communicate the temperature readings of the battery module 25 to the control module 27.

As depicted, the top portion 38A of the battery cells 30 remains uncovered by the epoxy resin. Once cured, the epoxy resin may act as a restraining medium in accordance with the present embodiments and may prevent, reduce, or mitigate swelling. It may be appreciated that, by conforming around the shape of each prismatic battery cell 30, the epoxy resin may provide more uniform contact around each prismatic battery cell 30 despite any defects or imperfections associated with manufacturing variability of each prismatic battery cell 30. As defined herein, the terms "conformal" and "conformally coated" should not be confused with a flexible and conformable material. Rather, the conformal nature of the epoxy resin, as used herein, is intended to denote the ability of the epoxy resin to be conformed about the prismatic battery cells 30 before it is set, so that the restraining medium is, in a sense, molded about the prismatic battery cells 30. In certain embodiments, the epoxy resin may contact every side or face of the packaging 32 of the prismatic battery cells 30 except the side of the packaging 32 that includes the vent feature 44 (e.g., contact sides 36A, 36B, 34A, 34B, 38B, but not side 38A, as illustrated in FIG. 3) and terminals 40, 42.

Prior to curing the epoxy resin, the temperature sensing components 84 may be positioned (e.g., hand fit) appropriately to align with and couple to the heat exchanger fins 68 when the carrier bar 58 is positioned over the battery module housing 47. Once the temperature sensing components 84 are fit to the designated heat exchanger fin 68, the user may bend the temperature sensing component 84 (e.g., the surface mount device) so that the temperature sensing component 84 is disposed between the battery modules 30 and in contact with the designated heat exchanger fin 68. The temperature sensing component 84 may be disposed between the side portions 36A, 36B of the battery cells 30. In some embodiments, the distance the temperature sensing component 84 is disposed between the side portions 36A, 36B may vary along the longitudinal distance 80. The distance the temperature sensing component 84 extends between the battery cells 30 may depend in part on the height of the heat exchanger fin 68. For example, the temperature sensing component 84 may extend far enough between the battery cells to be in contact with the free end 82 (e.g., distal end from the heat exchanger plate) of the heat exchanger fin 68. The position of the temperature sensing component 84 may be fixed by positioning the carrier bar 58 such that the temperature sensing component 84 is located in the space between the battery cells 30.

In certain embodiments, the epoxy resin may be electrically insulating, especially when the packaging 32 of the prismatic battery cells 30 has a positive or negative polarity; however, an electrically insulating epoxy resin may still be useful to limit leakage currents between prismatic battery cells 30 having neutral packaging 32. In accordance with present embodiments, the epoxy resin may be thermally conductive. It may be appreciated that using a conformal epoxy resin ensures that the restraining medium is in good thermal contact with a substantial portion of the surface of the packaging 32 of each prismatic battery cell 30 and with the battery module packaging 47, which may improve thermal transfer between the prismatic battery cells 30 and the aforementioned heat sink feature. In certain embodiments, the epoxy resin may also be useful to absorb gases (e.g., $CO_2$) and heat that may be released if one or more of the prismatic battery cells 30 undergoes a thermal event.

In certain embodiments, the epoxy resin may include a binary epoxy and/or a thermal epoxy and may include one or more additives to provide the above-mentioned properties. For example, in certain embodiments, the epoxy resin may be impregnated with metal (e.g., aluminum powder) or carbon particles to enhance thermal conductivity of the epoxy resin. In certain embodiments, the epoxy resin may be formed from one or more restraining medium precursor materials that may solidify upon curing. For example, in certain embodiments, the epoxy resin may be formed from a two-part epoxy resin that only begins to solidify after both parts have been mixed together. In certain embodiments, one or more restraining medium precursor materials may cure and solidify in response to heat, light, or mixing time. In certain embodiments, the epoxy resin precursor may be a liquid, solid, gel, powder, pellets, or a suitable compressed material (e.g., ceramic) that may be formed via curing, cross-linking, sintering, finishing, or another suitable solidification or finishing method.

Methods of manufacture of the described embodiments may be further understood with reference to FIG. 9, which is a flow diagram illustrating an embodiment of a method for manufacturing a battery module 25 of the present approach. In particular, FIG. 9 illustrates an embodiment of a method 100 of manufacturing a battery module that includes adding (block 102) a heat exchanger to the battery module housing 47. Then, the battery cells 30 are positioned on either side of a fin 68 of the heat exchanger (block 104). Next, the temperature sensing components 84 are positioned proximate the free end of the fin 68 of the heat exchanger (block 106). The battery module housing 47 is then filled (block 108) with a filler material 76 to cover the fin 68 of the heat exchanger and the temperature sensing component 84. Next, the prismatic battery cells 30 are attached (block 110) to the bus bars 50 and 52, for example, using laser welding to weld the terminals 40, 42 of the prismatic battery cells 30 to the bus bars 50, 52 of the bus bar assemblies 64. Then, the filler material 76 may be cured (block 112) to form the cured battery module 25. The curing (or other finishing/hardening step) results in the formation of a restraint system and thermal conduction path, and individually secures and restrains each prismatic battery cell 30 of the battery module 25. Additionally, in certain embodiments, other components of the battery module 25 (e.g., relays, control circuitry) may be similarly restrained within the restraining medium at the same time as the prismatic battery cells 30 for enhanced efficiency.

The technical effects of the present disclosure include the manufacture of battery modules having individually restrained battery cells. The disclosed designs enable the use of an epoxy resin disposed over a plurality of heat exchanger fins disposed in a housing of battery module to individually restrain the battery cells into position upon curing of the epoxy resin. The disclosed restraining medium individually prevents each of the battery cells from substantially swelling during operation, improving performance of the battery cells over the lifetime of the battery module. Further, the restraining medium may electrically insulate the battery cells, as well as promote battery cell cooling during operation of the battery module. Accordingly, the disclosed battery module designs offer improved flexibility and performance compared to other battery module designs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery module, comprising:
a battery module housing;
a heat exchanger comprising a plurality of fins disposed in the battery module housing;
a first lithium ion battery cell and a second lithium ion battery cell disposed within the battery module housing, wherein the first lithium ion battery cell and the second lithium ion battery cell are separated by a fin of the plurality of fins;
a temperature sensing component extending between a first side portion of the first lithium ion battery cell and a second side portion of the second lithium battery cell and touching a distal portion of a free end of the fin separating the first and second lithium ion battery cells; and
a filler material formed from a curable epoxy resin disposed within the battery module housing and between the first and second lithium ion battery cells and the fin, wherein the filler material is configured to cure to mechanically restrain the first and second lithium ion battery cells within the battery module housing and to conduct thermal energy between the first and second lithium ion battery cells and the fin; and
wherein the filler material covers the free end of the fin and the temperature sensing component, and the temperature sensing component is coupled to a conductor extending out of the filler material.

2. The battery module of claim 1, comprising a control module configured to monitor a temperature in the battery module, wherein the temperature sensing component is communicatively coupled to the control module via the conductor to provide the temperature.

3. The battery module of claim 1, wherein the curable epoxy resin is a binary epoxy, or a thermal epoxy, or a combination thereof.

4. The battery module of claim 1, wherein the filler material has a substantially uniform thermal conductivity in all directions.

5. The battery module of claim 1, wherein the filler material has a thermal conductivity value of between approximately 0.5 Watts per meter Kelvin (W/m–K) and approximately 1.5 W/m–K.

6. The battery module of claim 1, wherein the distal portion of the free end of the fin is positioned opposite a fixed end of the fin, and the fixed end of the fin is secured to a heat sink of the heat exchanger.

7. The battery module of claim 1, wherein the first and second lithium ion battery cells each comprise a top portion having a terminal, a bottom portion opposite the top portion, and side portions extending between the top and bottom portions, and wherein the filler material covers between approximately 60% and 95% of a longitudinal distance of the side portions.

8. The battery module of claim 1, wherein the first and second lithium ion battery cells each comprise a top portion having a terminal, a bottom portion opposite the top portion, and side portions extending between the top and bottom portions, and wherein the top portion of each of the first and second battery cells protrudes beyond the free end of the fin in a longitudinal direction of the first and second battery cells, and the filler material covers the first and second battery cells to a level between the free end of the fin and the respective top portions of the first and second battery cells.

9. The battery module of claim 1, wherein the first and second lithium ion battery cells each comprise a top portion having a terminal, a bottom portion opposite the top portion, and side portions extending between the top and bottom portions, wherein the heat exchanger comprises a heat sink disposed against the respective bottom portions of the first and second lithium ion battery cells, and the heat sink is in thermal contact with the filler material.

10. The battery module of claim 1, wherein the first and second lithium ion battery cells are prismatic battery cells.

11. The battery module of claim 1, wherein a cathode active material of the first and second lithium ion battery cells comprises lithium nickel manganese cobalt oxide (NMC).

12. The battery module of claim 1, wherein an anode active material of the first and second lithium ion battery cells comprises graphite.

13. The battery module of claim 1, wherein an anode active material of the first and second lithium ion battery cells comprises lithium titanate (LTO).

14. The battery module of claim 1, comprising:
a plurality of lithium ion battery cells disposed in the battery module housing and having the first and second lithium ion battery cells; and
a first bus bar assembly coupled to a first temperature sensor and a second bus bar assembly coupled to a second temperature sensor, wherein the first bus bar assembly and the second bus bar assembly are configured to electrically couple the plurality of lithium ion battery cells in a predetermined electrical configuration.

15. The battery module of claim 1, wherein the heat exchanger comprises a heat sink disposed against an internal surface of the battery module housing, and wherein the plurality of fins extend from the heat sink, wherein the fins of the plurality of fins are oriented substantially parallel to one another, and the fin disposed between the first and second lithium ion battery cells is one fin of the plurality of fins.

16. A lithium ion battery module, comprising:
a module housing;
a plurality of heat exchanger fins extending from a heat sink disposed within the module housing;
a plurality of lithium ion battery cells disposed within the module housing and interleaved with the plurality of heat exchanger fins;
a temperature sensor extending between a first side portion of a first lithium ion battery cell and a second side portion of a second lithium ion battery cell of the plurality of lithium ion battery cells and disposed on a distal portion of a free end of a heat exchanger fin of the plurality of heat exchanger fins; and
an epoxy filler material disposed between plurality of the heat exchanger fins and the plurality of lithium ion battery cells and over the heat sink, wherein the epoxy filler material covers a portion of each lithium ion battery cell of the plurality of lithium ion battery cells, covers the temperature sensor, and covers the free end of the heat exchanger fin.

17. The lithium ion battery module of claim 16, wherein the plurality of heat exchanger fins is integrally formed with the heat sink.

18. The lithium ion battery module of claim 16, wherein the epoxy filler material comprises a binary epoxy, a thermal epoxy, or any combination thereof.

19. The lithium ion battery module of claim 16, wherein the epoxy filler material has a thermal conductivity value of approximately 0.5 Watts per meter Kelvin (W/m-K) and approximately 1.5 W/m-K.

20. The lithium ion battery module of claim 16, comprising a control module configured to monitor a temperature in the battery module, wherein the temperature sensing component is communicatively coupled to the control module via a conductor to provide the temperature, the conductor protruding out of the epoxy filler material.

21. A lithium ion battery module prepared by a process comprising the steps of:
placing a heat exchanger comprising a plurality of heat exchanger fins into a battery module housing;
positioning a first lithium ion battery cell and a second lithium ion battery cell on either side of a fin of the plurality of heat exchanger fins;
positioning one or more temperature sensing components between a first side portion of the first lithium ion battery cell and a second side portion of the second lithium ion battery cell and onto a distal portion of a free end of one or more of the plurality of heat exchanger fins;
filling the battery module housing with an epoxy filler material such that the fin of the plurality of heat exchanger fins and the one or more temperature sensing components are covered with the epoxy filler material; and
curing the epoxy filler material such that the epoxy filler material restrains the lithium ion battery cells, the plurality of heat exchanger fins, and the temperature sensing components and serves as a thermal conduction path from the first and second lithium ion battery cells to a heat exchanger plate coupled to the plurality of heat exchanger fins.

* * * * *

UNITED STATES PATENT AND TRADEMARK OFFICE
CERTIFICATE OF CORRECTION

PATENT NO. : 10,199,695 B2
APPLICATION NO. : 14/805404
DATED : February 5, 2019
INVENTOR(S) : Lobert et al.

Page 1 of 1

It is certified that error appears in the above-identified patent and that said Letters Patent is hereby corrected as shown below:

In the Specification

1. In Column 1, Line 43, delete "full hybrid systems (FHEVs)" and insert --full hybrid electric vehicles (FHEVs)--, therefor.

2. In Column 1, Line 46, delete "mild hybrid systems (MHEVs)" and insert --mild hybrid electric vehicles (MHEVs)--, therefor.

3. In Column 3, Line 32, delete "DRAWINGS" and insert --BRIEF DESCRIPTION OF THE DRAWINGS--, therefor.

4. In Column 3, Line 60, delete "portion the" and insert --portion of the--, therefor.

5. In Column 6, Line 10, delete "running More" and insert --running. More--, therefor.

6. In Column 6, Line 20, delete "braking As" and insert --braking. As--, therefor.

7. In Column 7, Lines 51-52, delete "lithium nickel cobalt manganese oxide (NMC)" and insert --lithium nickel manganese cobalt oxide (NMC)--, therefor.

8. In Column 11, Line 55, delete "portion the" and insert --portion of the--, therefor.

9. In Column 12, Line 28, delete "battery modules 30" and insert --battery modules 25--, therefor.

10. In Column 12, Line 56, delete "battery module packaging 47," and insert --battery module packaging,--, therefor.

Signed and Sealed this
Second Day of April, 2019

Andrei Iancu
*Director of the United States Patent and Trademark Office*